United States Patent [19]

Kauffman

[11] Patent Number: 5,308,423
[45] Date of Patent: May 3, 1994

[54] METHOD OF MAKING MULTI-WALLED PIPES AND STORAGE TANKS FOR TOXIC AND CORROSIVE FLUIDS

[75] Inventor: Donn Kauffman, Daphne, Ala.

[73] Assignees: Theresa M. Kauffman, Daphne, Ala.; Martha A. Burdick, Meridian, Miss.; George L. Williamson, Daphne, Ala.

[21] Appl. No.: 56,354

[22] Filed: May 3, 1993

Related U.S. Application Data

[63] Continuation-in-part of Ser. No. 922,572, Jul. 30, 1992, abandoned, which is a continuation-in-part of Ser. No. 775,208, Oct. 11, 1991, abandoned, which is a continuation-in-part of Ser. No. 552,619, Jul. 16, 1990, abandoned.

[51] Int. Cl.⁵ .............................................. B65D 25/20
[52] U.S. Cl. ..................................... 156/171; 73/49.2; 156/188; 156/192; 264/258; 220/445; 220/645
[58] Field of Search ............... 156/171, 187, 188, 192; 264/257, 258; 72/49.2 T; 220/414, 426, 444, 445, 645

[56] References Cited

U.S. PATENT DOCUMENTS

| | | | |
|---|---|---|---|
| 3,335,904 | 8/1967 | Anderson | 220/414 |
| 3,392,865 | 7/1968 | Shriver | 220/444 |
| 3,412,891 | 11/1968 | Bastone et al. | 220/645 |
| 3,661,294 | 5/1972 | Pearson et al. | 220/414 |
| 3,796,620 | 3/1974 | Dunn | 156/187 |
| 4,098,426 | 7/1978 | Gerhard | 220/444 |
| 4,739,659 | 4/1988 | Sharp | 73/49.2 T |
| 4,778,075 | 10/1988 | Wiegand et al. | 220/645 |
| 4,781,777 | 11/1988 | Pugnale et al. | 156/187 |
| 4,925,046 | 5/1990 | Sharp | 73/49.2 T |
| 5,020,358 | 6/1991 | Sharp | 73/49.2 |
| 5,115,936 | 5/1992 | Bartlow | 73/49.2 |

Primary Examiner—Jay H. Woo
Assistant Examiner—Robert B. Davis
Attorney, Agent, or Firm—George L. Williamson

[57] ABSTRACT

Improved multi-wall containers and pipes for transporting fluids which have to be protected against leakage and mechanical forces, have an inner and outer wall separated by a continuous foam layer integrated into the containers. Improved strength and resistance to axial inertial pressure is provided by the method of manufacture using chopped glass fibers, continuous windings of glass fibers and suitable polyester resins and circumferential ribs spaced at stress points and integrally incorporated into the containment walls. Vessels produced according to the methods of the invention have a moment of inertia strength of about 4.67 in⁴ substantially eliminating torquing, buckling and rupture.

18 Claims, 4 Drawing Sheets

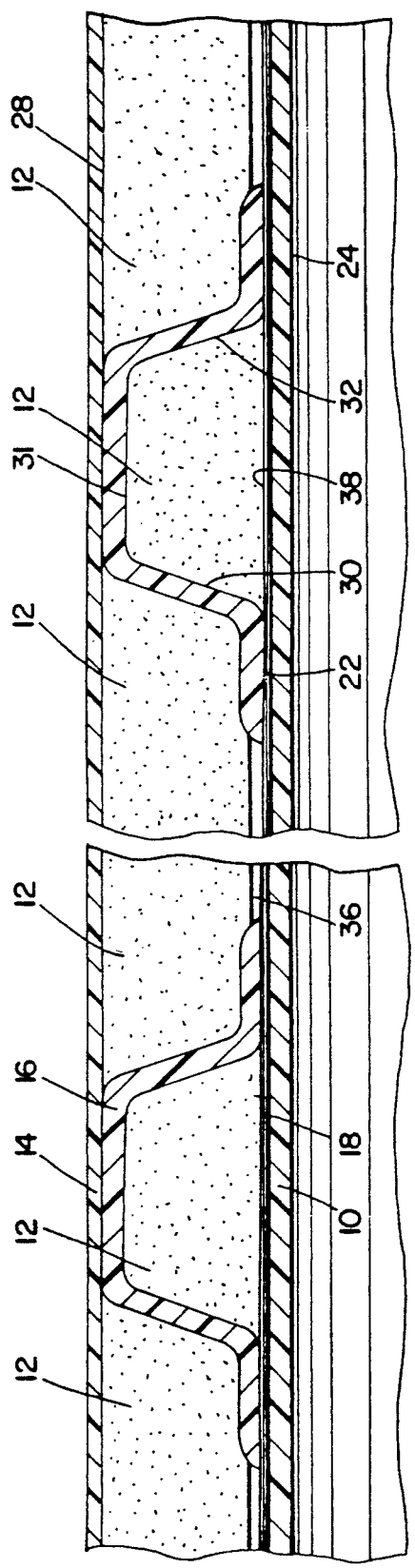
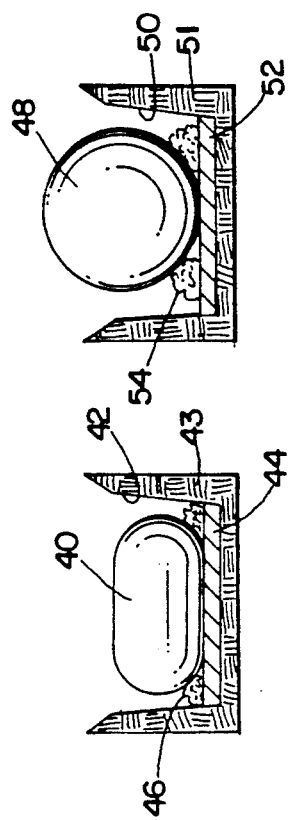
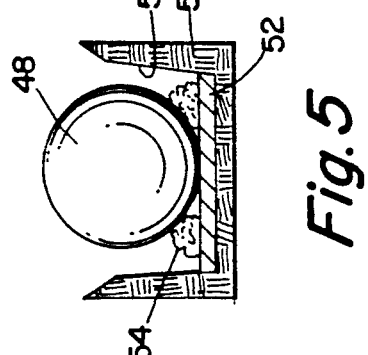
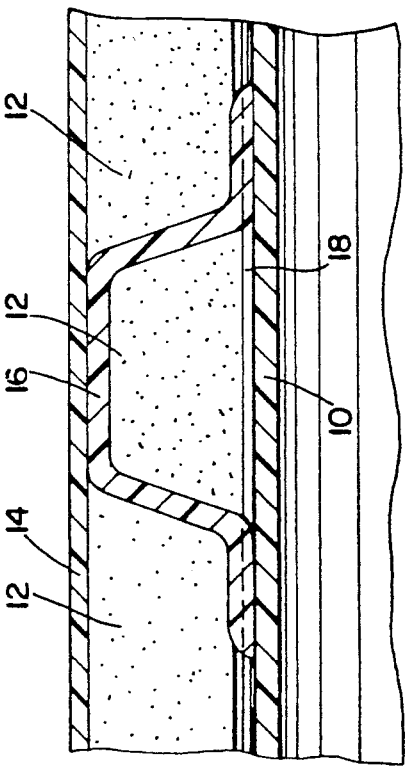

METHOD OF MAKING MULTI-WALLED PIPES AND STORAGE TANKS FOR TOXIC AND CORROSIVE FLUIDS

BACKGROUND OF THE INVENTION

This Application is a continuation-in-part of Ser. No. 07/922,572 filed Jul. 30, 1992, now abandoned, which was a continuation-in-part of Ser. No. 07/775,208 filed Oct. 11, 1991, now abandoned, which was a continuation-in-part of Ser. No. 07/552,619 filed Jul. 16, 1990 now abandoned.

This invention generally relates to rigid structures such as pipes and storage tanks for underground and/or aboveground placement which are used for transporting and holding hazardous, toxic, and/or corrosive liquids, fluids and petroleum products such as solvents, diesel fuel and/or gasoline. This invention also relates to a method of manufacturing such pipes and tanks.

It is well known that in transporting certain gases and liquids, it is often necessary to use container vessels having superior wall strength which protect the contents against changes in temperatures, the environment and unanticipated mechanical stresses such as those encountered during transportation and construction. For example, in order to provide insulation against thermal changes of the contents of such vessels, and insure against the vessel's temperature induced rupture, it is desirable to use reinforcing materials such as fiber reinforced plastics, lightweight non-corrosive metals, protective linings of glass and multilayer vessel construction of varying protective shapes all of which have been found useful.

An increasing number of Federal Regulations relating to the design and strength of certain storage vessels to better insure containment of toxic or corrosive materials and to avoid contamination of the environment by release, now provide for double walled tanks, some of which permit leak alarms to be installed in the tanks. In many instances heretofore, the space between the layers in multilayer pipes and tanks walls was usually filled with air, insulating material or rigid support members to avoid rupture of the container walls under stress.

Numerous attempts have been made to provide pressure-tight and leak proof containers able to withstand stress caused by lateral forces utilizing the placement of seams, bolts and/or other supports, for example, in addition to placing detection systems in the event of fluid leaks.

In U.S. Pat. No. 4,098,426 for example, the use of unpartitioned end walls coupled with support flanges was used in order to optimize the transmission of axial forces of inertia and to prevent fluid leakage at the joint seams of the two container shells of steel or aluminum alloy. Because the ultimate use of these metal tanks was for cryogenically effected fluids, a foamed insulating material was loosely provided between the vessels for insulation purposes. However no indication is provided as to the relative strength of those vessels, neither were any ribs integrated into the insulating wall for support.

Still other references are found such as U.S. Pat. No. 3,392,865 where filament-wound plastic shells employ closed shell polyurethane foams for thermal protection where a bleeder ply was used to provide gas conductance to a pressure tap in the event of gas leakage but again no indication is made as to the strength of the vessels described and in particular to the values of the lateral and axial inertia. Similarly, no method for making the interior containment wall comprising integrated ribs for support and positive total attachment is disclosed.

Anderson, in U.S. Pat. No. 3,335,904, disclosed a non-metallic horizontal storage tank especially suitable for the underground storage of liquid hydrocarbons comprising a plastic sandwich construction having an enclosing wall forming a tubular body portion and end walls defining a substantially closed hollow structure, said tank including an inner skin and an outer skin space therefrom and including core material of relatively low structural strength between said skins, the tubular body portion having circumferential reinforcing rib means between said inner and outer skins. Bastone, in U.S. Pat. No. 3,412,891, discloses an underground storage tank, including layers of continuous filament wound fiberglass with layers of chopped fiberglass reinforced resin to produce a monolithic composite layer structure. Furthermore, Bastone teaches the use of a polyurethane foam support rib. Sharp, in U.S. Pat. No. 4,739,659, disclosed a double wall ribbed storage tank with secondary containment capability including the provision of a leak alarm safety monitor. Dallum, in U.S. Pat. No. 4,876,124, disclosed a tank having a composite wall including an inner wall and an outer wall, the inner wall comprising a material resistant to corrosion by gasoline or alcohol and the outer wall comprising a non-hydrolyzable resin. Pugnale, et al, in U.S. Pat. No. 4,781,777 disclosed a doublewall tank having inner and outer walls.

However, none of the prior art includes the unique and novel features of the present invention.

From these and other references, it will be understood to those skilled in the art that multi-walled fiberglass reinforced fluid holding tanks require improved strength, extreme resistance to lateral pressure and require a high axial force of inertia.

It is an object of this invention to provide a process for making storage tanks and conducting pipe for the passage of fluids which possess a high axial force of inertia, are extremely rigid and are resistant to the stress of variable temperatures and movement.

It is a further object to provide pipes and storage tanks of improved strength which are resistant to pressure when placed underground and which can be made quickly and inexpensively.

SUMMARY OF THE INVENTION

The present invention provides for multi-walled tanks and pipes having an inner wall and an outer wall separated by and supported by ribs which are 100% bonded to and integrally bonded with and/or laminated to the inner and outer walls. The walls are composed of chopped and continuous glass fiber strands impregnated with resin. Closed cell foam is also provided in the interstitial spaces between the walls. Additionally, a highly chemically resistant barrier is mixed with the chopped glass fiber and is applied to the entire inner surface of the inner wall and the dished ends of the tanks. Furthermore, a leak alarm conduit is provided running along the tank bottom longitudinally and up and to the center of the dished ends of the tank. Further, spaces are provided on the outer surface of the inner wall to allow liquid materials, which would result from a leak, to flow or migrate to the leak alarm conduit. Tanks are designed with compartments in order to allow a leak alarm to indicate the exact location of a leak. This design provides for a tank that has improved strength characteristics and the present invention provides for a tank having a moment of inertia of about 4.67 in$^4$ which substantially eliminates torquing, buckling and rupturing. The term "fiberglass" as used in this specification will generally denote glass fiber reinforced resinous material either cured or uncured. When a glass fiber reinforced resinous material cures, it hardens and is frequently referred to in the industry as a laminate meaning generally the cured composite structure. Also, depending on the context, the term "fiberglass" may at times refer to glass fiber or a thin layer of woven glass fibers.

A method for constructing the tanks and pipes of the present invention is also provided. In summary, this includes forming a highly chemically resistant barrier about a first removal sheet on a mandrel, thereafter forming an inner-wall of chopped and continuous glass strands with resin over the barrier, adding a leak alarm conduit, applying rib shaped foam which acts as a form for the formation of the support ribs and thereafter forming the support ribs over the rib shaped foam. After formation of the ribs, bridging foam is placed between the ribs. Over this, chopped and continuous glass strands with resin are added to form the outer wall.

These and other objects are achieved in the present invention by providing an improved multi-walled storage tank of high strength and rigid construction whose method of construction is simple and less time consuming than the prior art.

A further object of the present invention is to provide a new and novel underground and/or aboveground fluid storage tanks which provides for an optional safety monitor in the event of fluid leakage or spillage. The present invention provides the only true environmental protection double wall tank with a positive leak alarm that is actuated within a short time of the leak. This tank is designed with compartments or alternating closed cells which enables the leak alarm to indicate the exact location of the leak. This eliminates the need to remove the tank from the ground to find the leak or perform a clean-up of the tank and/or soil, saving a great deal of time, money and product lost into the ground. The compartmentalized tank can be repaired in place because the alarm locates the leak accurately and indicates it on the computer readout.

The present invention provides tanks and pipes having a 100% bond between the ribs and the inner and outer structural wall of the tank. The present invention improves over the prior art tanks of this type by intergrating the construction of the cylindrical walls, the reinforcing ribs, and the foam material between the walls. The ribs are built up over the rib shaped foam bands which act as forms for the ribs, so that the ribs and rib feet become laminated to the inner wall. The outer wall is then built up over the ribs and the bridging foam layer located between the ribs, so that the outer wall becomes laminated and bonded to the ribs and results in a relatively level, smooth wall having no undulations. This intergration of the ribs and the tank walls provides greater strength than do other constructions wherein the parts are not positively interconnected and 100% bonded, locked, interlocked, and more particularly, immovably locked to each other. The bridging foam which is placed between the ribs acts merely as an aid to assure that the outer-wall is 100% bonded to the top of the rib, i.e., the foam in between the ribs is only there to act as a form so as to allow the outer wall to be layed up evenly without wrinkling. This integrated construction increases the moment of inertia so that this tank can be placed on the ground with no side support and when being filled will not deflect (See Example 5). No other currently available fiberglass tank can be filled unless backfill is added and compacted to the same level of the product inside the tank in order to prevent the sidewalls of the tank from bulging outward. Furthermore, this tank is the only fiberglass double-walled tank that does not require support from the surrounding soil to keep the tank round, i.e., to keep the tank from deflecting which could cause a failure.

The closed cell foam material used in the present invention is somewhat compressible. It is a further object of the present invention, to assure that no material, e.g. foam, is placed in the interstitial spaces between the walls of the present invention that could cause a rupture, collapse or other failure due to the interaction of materials having different thermal coefficients of expansion which interaction could be caused by changing temperature conditions.

BRIEF DESCRIPTION OF THE DRAWINGS

FIG. 2 is one embodiment of a cross-section of the tank or pipe wall of the present invention.

FIG. 3 is one embodiment of another cross-section of the tank or pipe wall of the present invention.

FIG. 4 is an elevation view of a buckling tank.

FIG. 5 is an elevation view of a normally round underground storage tank.

DETAILED DESCRIPTION OF THE PREFERRED EMBODIMENT(S)

Containment vessels, such as tanks for underground storage, and pipes made with locating bell sections and joined by welding, joining a wet joint or butt joint thereafter, are useful in transporting and holding fluids such as petroleum products like gasoline, alcohol enhanced gasoline, jet fuel, diesel fuel, oxygenated fuels, fuel oil with certain temperature limitations, and corrosive substances and the like which spillage thereof would be environmentally detrimental, costly and dangerous. The tanks of the present invention, for example, are composed of multi-containment walls or layers constructed of fiberglass or glass fibers in continuous windings and chopped glass fibers bonded with a suitable resin. It should be noted that the term "fiberglass" as used in this specification will generally refer to a glass fiber reinforced resinous material either cured or uncured. When a glass fiber reinforced resinous material cures, it hardens and is frequently referred to in the industry as a laminate meaning generally the cured composite structure. Also, depending on the context, the term "fiberglass" may at times refer to glass fiber strands. Between these layers, in the air space or interstitial space, is placed closed cell foam such as a urethane foam, between the outer wall of the vessel, tank or pipe and the inner wall of the tank. In a preferred embodiment, a leak alarm conduit is placed between these walls in order to detect fluid leaks and provide an appropriate alarm to the operator.

As a buried structure, the tank is subjected to a variety of stresses. Each unit must be able to resist deflection equaling not more than 2% of its diameter. Also, the tank vessels must be able to withstand the loads due to soil overburden. Soil density, soil consistency, degree of compaction, and bedding angle all play an integral part in determining the required stiffness factor. An additional benefit realized from designing the present invention for worst case underground conditions is a stronger structure that resists breakage during handling.

In the event of a process or operational failure yielding a partial vacuum on the tank, the structure must likewise resist buckling. Unfortunately, with negative internal pressure, all benefit from soil support is lost. The storage tanks of the present invention are designed, and have been successfully tested, to withstand a combination of external loads due to burial and negative internal pressure due to partial vacuum unlike those of the prior art (See Example 5). This is a unique and novel improvement of the present invention over the prior art.

Replacement of the air between the walls or interstitial space with a continuous core material, such as polyurethane and the like, improves the insulative qualities of the tank and results in decreased condensation of moisture in the inner tanks.

Figure 1:
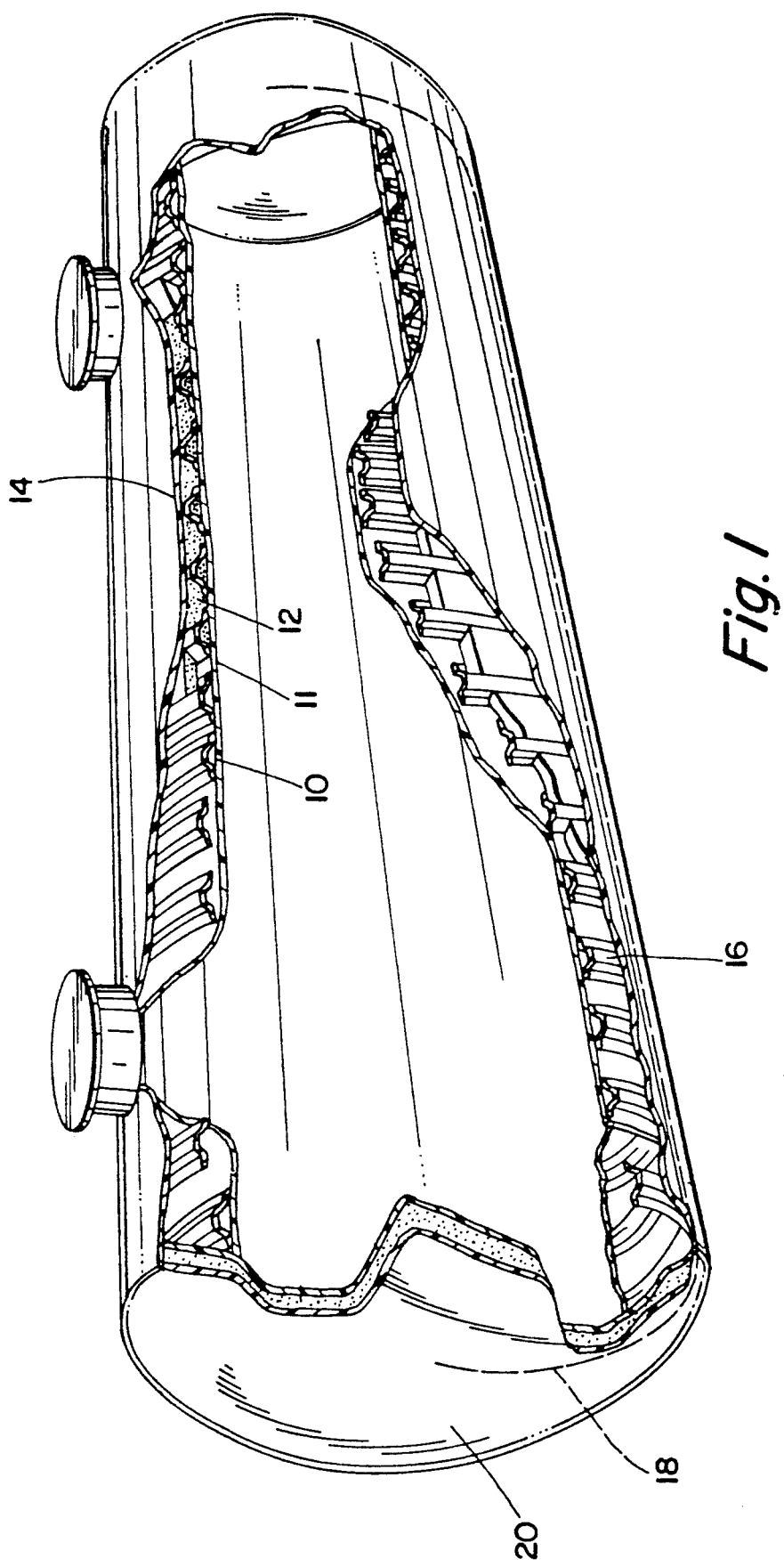
FIG. 1 is one embodiment of a cross-section perspective of the present invention showing a multi-walled storage tank.

Turning to the drawings, the storage tank shown in FIG. 1 comprises a first or inner containment wall or layer (10) of chopped and continuous glass fiber strands and resin having a highly chemically resistant barrier on its inner surface (11). Over this, is a layer of closed cell foam (12) in the interstitial space. The second or outer containment wall or layer (14) is comprised of chopped and continuous glass fiber strands and polyester resin similar to the first layer. The fiberglass or glass fiber reinforced resinous material urethane ribs (16) are more or less evenly spaced circumferentially at predetermined stress points and are in integral contact with and are 100% bonded to the inner and outer walls. A leak alarm conduit (18) runs along and contiguous with the outer surface of the inner wall, i.e., longitudinally along the bottom of the tank and up to the approximate middle of the dished tank ends (20).

FIG. 2 shows a cross-section of the tank or pipe wall taken along the leak alarm conduit. Therein is shown the inner wall (10). A leak alarm conduit (18) is placed on the outer surface of the inner wall running longitudinally along the tank. The reinforcing ribs (16) are shown in integral contact with the inner wall (10) and the level outer wall (14) with the foam (12) in between. The top of and feet of the ribs are bonded to each wall respectively at the contact points (22), (24), (26); and also with the closed cell foam (12) at the contact points (30), (31) and (32). The foam (12) almost completely fills the interstitial space between the walls, however, an approximate ⅛" wide open space (36) is shown between the foam (12) and the outer surface of the inner wall (10) to allow liquid to flow to the leak alarm conduit. Also, note that while the foam is in close contact with the inner wall (10), it is not bonded to the inner wall (10) along the point (38) in order to provide a small space to allow liquid to flow to the leak alarm conduit. The foam (12) is bonded to the outer-wall (14) along the contact point (28).

FIG. 3 shows another cross-section of the tank or pipe wall indicating the leak alarm conduit as a hidden line. The same general features of FIG. 2 are shown again, being, the inner-wall (10), the closed cell foam (12), the outer wall (14), the ribs (16), and the leak alarm conduit (18). The purpose of FIG. 3 is simply to show that the feet of the ribs pass over, surround and totally encase the leak alarm conduit thereby necessitating the hidden lines to show the leak alarm conduit (18).

FIG. 4 is a cross-section elevation showing an underground storage tank which is in a bulging or buckled state. Therein, is shown the tank (40), an excavated hole (42) in the earth (43), a bed of fill material (44) underlying the tank and some backfilled material (46). FIG. 4 is included to illustrate the type of buckling that can occur with a weaker type currently available storage tank. This type of failure will not occur with the present invention. Note that the type of failure shown in FIG. 4 can result in a rupture and leaking situation which could cause severe soil and/or groundwater contamination.

FIG. 5 shows an underground storage tank (48) of a normal configuration which is not buckled. Included is a hole (50) in the earth (51) along with a partial bed of fill material (52) including some backfill (54). This figure illustrates the configuration, i.e., "0" deflection, which results with a tank designed according to the present invention. This is further explained in Example which follows.

A more detailed description of the method of making the present invention follows: (1) A steel mandrel is assembled, but serves only as a mold or form for the fiberglass laminate and is not part of the tank or pipe itself; (2) An unsaturated polyester resin epoxy novolac-based vinyl ester, which is generally inert and/or impervious to chemicals and/or fuel additives, is applied concurrently with chopped glass fibers only and a glass fiber veil or "c" veil to an overlay comprising a first sheet such as a plastic film, e.g., MYLAR, or the like and cardboard, paperboard, or the like which overlaps the mandrel and permits easy removal of the formed tank. This forms a highly chemically resistant barrier in a thickness of from about 0.100" to about 0.120" and preferably from about 0.110" to about 0.114"; (3) Chopped glass fibers and continuous glass fiber strands and resin are applied over the chemically resistant barrier to build up and form the inner wall to an approximate thickness of about 0.330". Increased structural strength is provided during this step by adding continuous fiberglass strands in a circulinear or hoop-like fashion circumferentially encompassing the tank. It is believed that applicant's tanks are the only tanks available commercially incorporating this advantage; (4) The leak alarm conduit is placed on and attached to the tank bottom and up to the center of the dished end of the tank; (5) Rib shaped foam is circumferentially applied about the inner wall without bonding there between and is held in place with continuous glass strands or bundles. This foam is pre-cut into the proper shape, i.e., preformed, for the ribs which will be formed by laminating over these rib-shaped foam sections. (See FIG. 6 which follows); (6) In order to make glass fiber ribs on about 16½" centers for separating and supporting the inner and outer walls, chopped and continuous glass fiber is used to overlay the rib shaped foam, made from suitable material such as polyurethane or the like, which was attached to the outer surface of inner wall in the preceding fifth step. The ribs are manufactured to a minimum 0.25" thickness. During this step, the feet of the ribs become 100% bonded, locked, interlocked, or immovably interlocked to the inner wall. However, the rib shaped foam does not become bonded to the inner wall so that liquid can flow downward toward the leak alarm conduit in the event of a leak in the inner wall. (See FIG. 7 which follows); (7) To the tank now assembled with the ribs incorporated, closed cell bridging foam is applied between the ribs and up to, level with and flush with the top of the ribs. The relatively level and flat prepared surface formed by the tops of the ribs and the bridging foam prevents wrinkling or bubbling of the laminate which will next be laid up over the ribs and the bridging foam. This helps assure a strong, continuous, 100% bond between the ribs and the outer wall. Note that the bridging foam is pre-formed or pre-cut to provide an approximate $\frac{1}{8}$" air space between the foam and the outer surface of the inner tank wall so that liquid can flow downward toward the leak alarm conduit in the event of a leak in the inner wall. (See FIG. 8 which follows); (8) It is over this that an outside laminated tank wall is formed and is applied over the formed and finished foam top and is contacted with and positively the formed and integrally incorporated ribs. The total laminate thickness on the outer wall is approximately the same as the inner wall laminate thickness. The resulting outer wall is relatively smooth, level and flat and has no ridges, valleys or undulations in it.

Note that the dished ends are formed on the mandrel at the same time and in the same step as the inner and outer walls, respectively, however, no support ribs are used in the dished ends since the configuration provides them the necessary structural strength.

Figure 6:
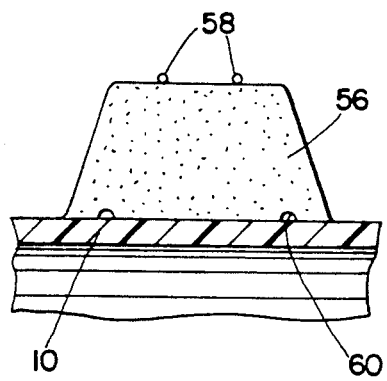
FIG. 6 is a cross-section of rib-shaped foam being held in place by continuous glass strands.

In FIG. 6 there is shown a cross-section of the bridging foam (56) held in contact with the inner wall (10) by continuous glass strands (58). Additionally, another embodiment is illustrated in the foam comprising grooves (60) to a depth of about $\frac{1}{4}$" cut into the face of the rib-shaped foam which faces and is in close contact with the inner wall (10). The gooves will allow liquid to more easily flow to the leak alarm conduit.

Figure 7:
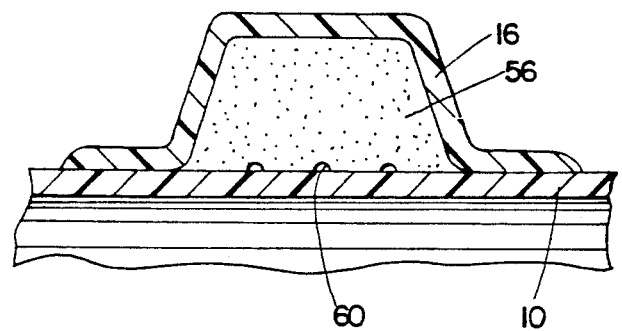
FIG. 7 is a cross-section of the completely formed rib over the rib-shaped foam.

FIG. 7, shows the inner wall (10), the rib-shaped foam (56), the ribs (16), and the embodiment of the grooves (60) cut into the rib-shaped foam. FIG. 7, illustrates a cross-section of the present invention which results after the ribs are laminated over the rib-shaped foam.

Figure 8:
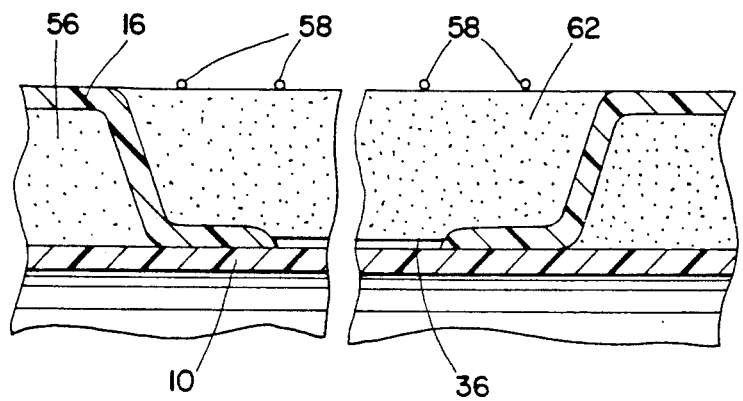
FIG. 8 is a cross-section of the bridging foam which is placed between the ribs being held in place by continuous glass strands.

FIG. 8, shows a cross-section of the present invention after the ribs are formed and the bridging foam is put into place. Shown therein is the inner wall (10), the ribs (16), the rib-shaped foam (56), the bridging foam (62), which is held in place by continuous glass strands (58) along with the approximate $\frac{1}{8}$" space (36) provided between the bridging foam and the inner wall.

It should be obvious that multi-walled containers having as many walls are desired, e.g., 4–5 walls, could be built according to the methods previously described.

In practice, the tanks are completely built in two cylindrical halves including the dished ends prior to removing them from the mandrels and then joined together along with the appurtenances such as the leak alarm conduit to form the finished tank as previously described. It is necessary to form the tanks in halves in order to remove them from the mandrels. Pipes can be built as one piece, and not in halves, since they are open ended and can be removed from the mandrels by sliding the mandrels through the open pipe ends.

Where reinforcing materials are used, such as in the form of fiberglass, glass fiber reinforced resinous material, chopped or continuous roving or roving fabric, or any combination of these, the bond between the glass and the resin is provided by a suitable coupling agent.

Fillers, additives and surfacing materials may also be used to advantage and are generally inert to both the environment and the contents of the tank or pipe. In addition, various agents such as promoters, ultraviolet light filters, catalysts and the like can also be employed. While a preferred method of manufacture encompasses filament winding, the basic manufacturing process may also be advantageously effected by centrifugal casting, contact-molding, compression molding, pultrusion and various combinations thereof.

Because the dished ends of the tank are laid up in the same manner as the tanks themselves, they are an integral part of the tanks, having no joint seams or seam points to stress, thereby avoiding nuts and bolts capable of rupture. Note that the walls of the tank or vessel and the walls of the dished ends thereof are one piece.

A leak alarm conduit is present as a preferred embodiment. As shown in FIG. 2, the leak alarm conduit (18) is placed between the foam (12) and contiguous with the outermost surface of the inner wall (10). Once the last fiberglass layer is laid down on the inner tank wall, and before the rib shaped foam is placed in what would otherwise be the interstitial space between the first and second containment wall or layer, the leak alarm conduit is set into place. Currently the PermAlert AT, a trademarked system for leak detection and space monitoring available from PermAlert Environmental Specialty Products Inc., a subsidiary of Midwesco, is being used. This monitors for installation irregularities, static moisture and standing liquid, droplets and/or other liquid intrusions by using probes and sensing cables in a single unified sensing string which pinpoints leaks in the system. Specific sensors are used depending on the fluids contained in the tank in order to detect liquid seepage, ruptures or breaks. This type technology is based on time domain reflectometry and operates somewhat like radar in that thousands of times each minute, energy pulses are sent out on a dry sensor conduit or cable; as the energy pulses travel down the sensor cable, reflections are returned to the monitoring unit which digitizes these echoes and creates a digital map of the entire length of the dry cable. This technology creates a new digital map every few seconds and compares the current map to the "dry" map stored in its memory. The presence of water or water based and hydrocarbon fluids around the sensor cable, in sufficient quantities to wet the cable, will alter its electrical properties. This alteration will cause a change in the reflection from that wet cable segment which change is recognized by the minitoring unit. When a change is recognized the minitoring unit checks to confirm the change before indicating an alarm condition and displaying the location of the problem. However, it should be noted that other types of leak alarm conduits could possibly be used with the present invention. By way of example, a hydrocarbon specific cable which ignores water could be used. Leak alarm output indicates various data including the fault condition at a leak or break, distance of fault to data retrieval location, date, and time of fault. The cable is reusable after repair and clean up. The conduit is attached to a monitor capable of alerting the operator and providing the above information.

Figure 9:
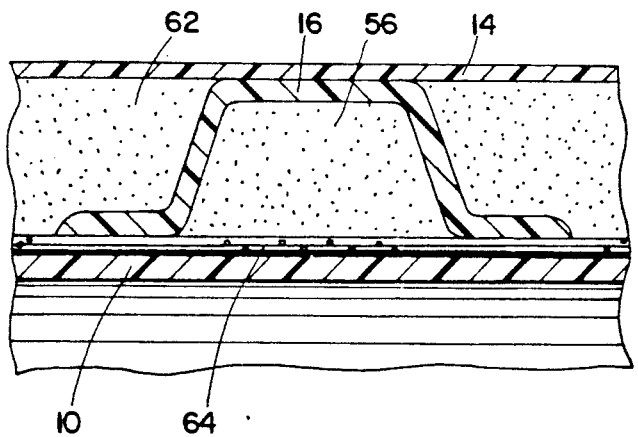
FIG. 9 is a cross-section showing another embodiment of the present invention.
Figure 10:
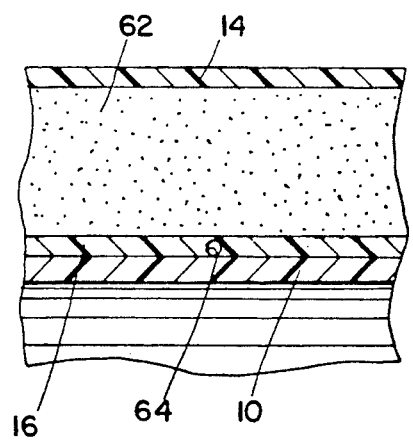
FIG. 10 is an elevation view of another embodiment of the present invention shown in FIG. 9.

By way of example, FIGS. 9 and 10 are offered to illustrate another embodiment of a different type leak detection system. In FIG. 9, there is shown the inner wall (10), the ribs (16), the outer wall (14), the bridging foam (62), the rib-shaped foam (56) and a flow through pipe or conduit (64), e.g., pvc pipe which is perforated in order to allow liquids to enter into the pipe and flow throughout the compartments or cells of the tank throughout the length of the tank. Note in FIG. 9 that the flow through conduit (64) is not perforated in the area under the rib feet in order to keep the liquid resin materials prior to curing during construction from leaking through the perforations of the pipe into the inside of the pipe and thereafter hardening and blocking the inside of the pipe so that no liquids could flow through the pipe. FIG. 10, is a side elevation view of FIG. 9 showing the inner wall (10), the outer wall (14), the rib feet (16), the bridging foam (62), and the flow through pipe or conduit (64) encased in the rib feet. In practice, it is anticipated that these flow through pipes could alternatively be placed near the bottom of the tank, midway up the sides of the tank, and/or near the top of the tank in order to capture all leaks of either liquids or vapors.

Figure 11:
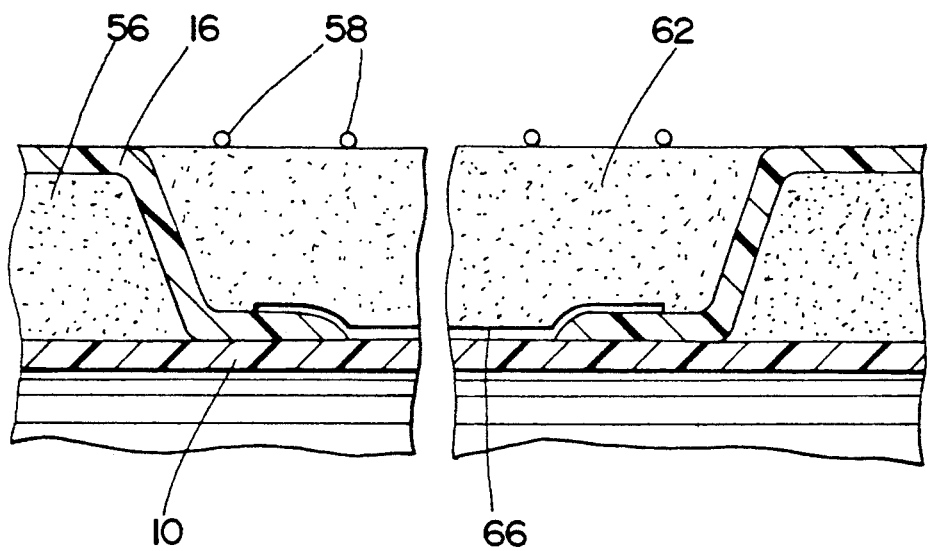
FIG. 11 is a cross-section of another embodiment of the present invention.

FIG. 11 illustrates another embodiment of the present invention. Therein is shown the inner wall (10), the ribs (16), the rib-shaped foam (56), the continuous glass strands (58), the bridging foam (62), along with a thin sheet or layer of film (66), provided between the bridging foam and the inner wall. Note that FIG. 11 is not drawn to scale and that the film (64), appears to be thicker for illustration purposes than a to-scale drawing would appear. The sheet or film (66), could be made of any non-reactive, flexible, impervious material such as plastic, MYLAR or the like. The film (66), is placed between and over the outer ends of the outer surfaces of the feet of the ribs, between the bridging foam and the inner wall and is laid over the leak alarm conduit. The continuous film which is about 10"-12" in width is wrapped completely around the tank and the ends of the film are taped, stapled, glued or otherwise fastened together where they meet preferably near the top or upper portion of the tank. This wrapping of film is repeated between each of the ribs of the tank. The film (64), may be placed around the tank by hand or machine. The purpose of the film (64), is to ensure, enhance the likelihood of, and accelerate the movement toward the leak alarm conduit of any liquid resulting from a leak through the inner wall. In practice, during the manufacturing process, the layer of film (64), is placed around the tank after the ribs are formed and before the bridging foam is attached to the tank. The film (64), makes it unnecessary to provide the approximate ⅛" air space as shown in FIG. 8. Note that the film (64), prevents the leak alarm from detecting leaks occurring through the outer wall.

Because of the unusual strength provided by the method of construction of the present invention, it is possible to make tanks varying in size and volume from about 4 feet in diameter to about 12 feet in diameter and having a length of from about 18 feet to about 37 feet. The pipe sections can also vary from about 20 feet to about 60 feet and from about 14 inches diameter to about 144 inches. The general shapes for the pipes and tanks are circular in cross section when assembled. However, it is believed that non-circular shapes could also be manufactured and could be useful for certain applications similar to the various shapes of concrete pipe used for different applications.

Although several specific examples of the inventive concept have been described for purposes of illustration, the invention should not be construed as limited thereby or to the specific features mentioned herein except as they may be included in the claims appended hereto as interpreted by the prior art. It is also understood that certain changes can be made without departing from the spirit and scope of the present invention.

Several Examples follow which further define and teach various aspects of the present invention.

EXAMPLE 1

A steel mandrel is prepared and covered over with plastic film and cardboard to facilitate removal of the plastic tank from the mold when finished.

A double layer of fiberglass, i.e., glass fiber veil or "c" veil, commercially available and manufactured by Superior Glass Co. of Ohio is applied. These are wetted out with Derakane 470-36 vinylester resin, commercially available from Dow Chemical. The spraying procedure is continued non-stop with chopped glass fibers, available commercially as Pittsburgh Plate Glass (PPG) HYBON 600 gunroving until a total thickness of about 0.110 inch is applied. HYBON is glass filament with a specially treated finish for being used with and run through a chopper gun.

While this step is cooling after the peak exothermic reaction, chopped glass PPG HYBON 600 gunroving and continuous glass PPG 0.1064-247 filament winding glass is machine applied using polyester resin ISO available from Inter-Plastic Corp. (as COR 75-AA-OSO resin) to a measured thickness of about 0.220 inch. The bond here is now both a chemical and mechanical bond and the total inner wall tank lamina thickness is about 0.330 inch.

After curing, foam rib forms, made of closed cell urethane are now attached circumferentially to the outer surface of the inner tank by continuous glass stands or bundles thereof.

A preferred shape of the ribs on cross-section is a trapezoid, in which the parallel sides are about 4" in length on the base, i.e., between the feet, with its parallel side on top being about 2½" in length. Each of the rib feet are about 2" in length. The equal and opposite sloping sides, angled at about 45° from the base, are about 1¾" in length.

The glass materials previously used to form the inner wall of the tank are applied over the rib-shaped foam forms and become laminated to the outside of the inner tank, forming a fiberglass rib having a glass thickness of about ¼".

Next, the thus-formed inner wall in the spaces between the thus-formed urethane ribs are covered with about 1½"-thick closed cell urethane foam for bridging between the ribs. This foam forms an impervious skin and is pre-formed so as to be level with the top of the ribs giving a nominal thickness of approximately 1¼". Then using the same polyester resin, cut glass fibers and continuous glass fibers, the outer containment area is laid up as the outer tank wall, having a thickness of about 0.300".

EXAMPLE 2

The same procedure as described in Example 1 is used employing a mandrel sufficient in size to provide a tank section of about 30 feet in length which includes circumferential urethane ribs as support spaced on centerlines of about 16 inches. The diameter is about 8 feet. These sections have one dished end on each end and, when joined by weld, have no joints seams or seamed ends where the walls and dished ends meet.

The resulting moment of inertia of the rib, outer wall, and inner wall is calculated at a minimum of about 4.675 in$^4$. The modulus of elasticity is determined as $9 \times 10^5$ psi representing contact molding. That modulus of elasticity is used to determine the resulting stiffness factor at $4.20 \times 10^6$ lb in$^2$.

In order to determine certain physical tests more fully set forth and described by the American Society for Testing Materials, the following physical characteristics are determined from representative sections or panelling used in the manufacture of the tank and the elongated pipe sections.

|  | ISO |
| --- | --- |
| Flexural strength. psi. ASTM D790 | 24.600 |
| Flexural Modulus. psi $\times 10^5$. ASTM D790 | 9.79 |
| Tensile Strength. psi. ASTM D638 | 13.000 |
| Tensile Modulus. psi $\times 10^5$. ASTM D638 | 11.5 |
| Percent Elongation. ASTM D638 | 1.40 |
| Compression Strength. psi. ASTM D695 | 18.600 |
| Hardness. Barcol 934. ASTM D2583 | 38–45 |
| Percent Non-Volatile. ASTM D2584 | 32.92 |

EXAMPLE 3

Using a mandrel which provides about 30 feet in length and a diameter of about one foot, the same materials and process steps are employed to provide identical recurring sections of hollow, 2-containment layer sections without the dished ends which are then welded or otherwise joined together end-to-end to form seamless conducting pipe. These are corrosion-resistant and leak proof and extremely rigid.

EXAMPLE 4

Various tests are conducted to determined the (1) internal impact resistance (2) internal pressure and (3) surface hardness of a tank made according to the present process. These were found to be as follows by standards set forth in ASTM Standards, D4021-86:

| 1. | ASTM D4021-86 | −8.9 and 6.9 |
| --- | --- | --- |
| 2. | ASTM D4021-86 | 8.5 |
| 3. | ASTM D4021-86 | 8.12.3 |

EXAMPLE 5

A test tank was built from two cylindrical halves which were inspected during the manufacturing process. Prior to connecting the two halves the interior surfaces were inspected for fiber, cracking, crazing, large wrinkles and delaminations.

Barcol Hardness readings were conducted on exterior and interior surfaces of the halves. the readings were averaged and were as follows:

| Interior | 41.6 |
| --- | --- |
|  | 43.8 |
| Exterior | 33.6 |
|  | 37.2 |

After the halves were joined the exterior surface was inspected for fiber show, blisters and smoothness.

The tank was considered to be in satisfactory condition after all per-test inspections.

The test pit was prepared to meet the requirements of ASTM-4021-86. The tank was lowered into the pit and anchored. At this time a zero deflection reading was made.

The external load tests were then started.

The earth load test was the first test conducted. It consisted of covering the tank with pea gravel to a depth of 36 (+) or (−) 3 inches from the top of the tank. The deflection at the top of the tank was measured and recorded. Deflection was 1/16".

A concentrated load was applied near the middle of the tank. A 25 ton ram on a steel plate that measured 20"×20" placed on the pea gravel was used. Total load was 22,600 lbs. and deflection was 1/16".

The pit was filled with water to 36-3 inches above the top of the tank. Deflection was measured as 0". The load was held for twenty-four hours and 0" deflection was noted.

The tank was sealed and a vacuum pump connected. The interior pressure was lowered to −5.5 inches of Hg (Mercury). The fluid in the pit was pumped into the tank to a level near the top of the tank. Air pressure was applied to the tank at a pressure of 25 psig and during the next minute the pressure dropped to 24 psig.

The tank was pumped dry and removed from the pit. The unsupported tank was then connected to a vacuum pump and a negative pressure of 3.0 psig was attained. At this time, the internal impact test was performed. No damage was visually noted.

The tank was pressurized to 5 psig and the exterior was washed with a detergent and water solution. No leakage was detected.

Results of tests and inspections were satisfactory and conformed to ASTM D-4021-86.

EXAMPLE 6

A tank constructed substantially according to the teachings of the present invention has been tested by Underwriters Laboratories, Research Triangle Park, N.C. using procedure UL 1316 or equivalent, entitled "Glass-Fiber-Reinforced Plastic Underground Storage Tanks For Petroleum Products". A summary of the test follows:

1. Pneumatic pressure to 5 psi was applied and held for 1 hour. (The tank may be transported to the hole site while under pressure.) No leaks were detected. A pipe fitting test was conducted using 3800 lbs. torque and the tank passed with no deflection.

2. Inspect the tank for leaks (make repairs if needed) No leaks at 5 psi were detected.

3. Set the tank into the hole.

4. Apply 600 gallons of water in the tank and lift for 1 second, and then do leakage test. The tank passed the test to add 4800 lbs. to tank. By mistake over 20.000 lbs. of water was added with no deflection, and then a leak test performed. No leaks were detected.

5. Fill the tank to capacity (1200 gallons). While the tank is filling, the strapping operation can be done. No deflection and no leaks were detected.

6. After the tank is strapped down and still filling with water the hole can be filled with pea gravel. No deflection and no leaks were detected.

7. When the tank is filled, hold for 1 hour and empty the water in the tank into the hole. The tank must stay in this condition for 24 hours. No deflection and no leaks were detected.

8. Pump the water out of the hole and into the tank, add water if necessary to fill the tank to capacity. Pressurize the tank to 25 psi and hold for 1 minute. No deflection and no leaks were detected.

9. Empty the tank and get it out of the hole.

10. Apply 5 psi air test and check for leaks. No leaks were detected.

I claim:

1. A process for making multi-walled vessels of improved circumferential and axial strength for transporting and storing fluids, comprising the steps of:
   (a) Assembling on a cylindrical form or mold an overlay comprising first sheet to receive a first layer of glass fiber reinforced resinous material;
   (b) Applying a resinous material with chopped glass fibers over said first sheet to form a highly chemically resistant barrier;
   (c) Applying over said highly chemically resistant barrier, a resinous material with chopped glass fibers and continuous strands of glass fibers;
   (d) Curing said resinous material containing said chopped glass fibers and continuous strands of glass fibers to form a first containment wall;
   (e) Applying at predetermined points on said first containment wall substantially circumferential preformed continuous rib shaped foam, and securing said foam to said first containment wall;
   (f) Applying over said rib shaped foam chopped and continuous glass fibers with a resinous material form a plurality of substantially circumferential ribs integrally bonded to said first containment wall;
   (g) Applying and securing bridging foam to said first containment wall between said ribs up to the level of the top of said ribs;
   (h) Applying over said bridging foam and said ribs, a resinous material with chopped glass fibers and continuous strands of glass fibers;
   (i) Curing said resinous material containing said chopped glass fibers and continuous strands of glass fibers to form a second containment wall integrally bonded to said ribs;
   (j) Attaching to said first containment wall a leak alarm safety monitor to detect liquid seepage;
   (k) Applying an impervious layer of film between said first containment wall and said bridging foam;
   (l) Applying said layer of film between the outer surfaces of said ribs;
   (m) Applying said layer of film over said leak alarm safety monitor; and
   (n) Having said layer of film extend entirely around the vessel.

2. The process of claim 1, wherein said rib shaped foam and said bridging foam is comprised of polyurethane.

3. The process of claim 1, further comprising integrally bonding said ribs to each of said first and second containment walls of the vessel.

4. The process of claim 1, further comprising joining together end-to-end said vessels to form continuous conducting pipe.

5. The process of claim 1, wherein said leak alarm safety monitor further comprises a conduit running longitudinally along the entire length of said vessel.

6. The process of claim 5, wherein said conduit are contiguous with the outer surface of said first containment wall.

7. The process of claim 5 wherein the feet of said support ribs totally encase said conduit.

8. The process of claim 1, said vessel further comprising having dished ends.

9. The process of claim 8, having dished ends having no joint seams between the walls of the vessel and the walls of said dished ends.

10. The process of claim 8 further comprising the walls of said vessel and the walls of said dished ends being one piece.

11. The process of claim 1, having an approximate $\frac{1}{8}''$ space between said bridging foam and said first containment wall.

12. The process of claim 1, having said leak alarm safety monitor conduit pinpoint the leak along the length of said vessel.

13. The process of claim 5, having said leak alarm safety monitor conduit run up to the approximate middle of said dished ends and thereby monitor for leaks occurring in the dished ends of said vessel.

14. The process of claim 1, having approximate $\frac{1}{4}''$ grooves in the face of said rib shaped foam said face being contiguous with the outer surface of said first containment wall.

15. The process of claim 1, further comprising joining together sections of said vessels to form seamless conducting pipe.

16. The process of claim 1, wherein said resinous material of step (b) further comprises vinylester resin.

17. The process of claim 1, wherein said resinous material of steps (c), (d), (f), (h) and (i) further comprise polyester resin.

18. The process of claim 1, further comprising the steps of:
   (a) assembling on a suitable form or mold an overlay comprising cardboard;
   (b) applying a first sheet over said cardboard;
   (c) applying a resinous material with a glass fiber veil over said first sheet; and
   (d) applying a resinous material with chopped glass fibers over said veil to form a highly chemically resistant barrier.

* * * * *